(12) United States Patent
Lu

(10) Patent No.: US 7,867,645 B2
(45) Date of Patent: Jan. 11, 2011

(54) LATCHING MECHANISM FOR BATTERY COVER ASSEMBLY

(75) Inventor: Chi-Chung Lu, Tainan Hsien (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 847 days.

(21) Appl. No.: 11/769,653

(22) Filed: Jun. 27, 2007

(65) Prior Publication Data
US 2008/0193837 A1   Aug. 14, 2008

(30) Foreign Application Priority Data
Feb. 9, 2007   (CN) ................. 2007 1 0073257

(51) Int. Cl.
H01M 2/10 (2006.01)
H01M 2/08 (2006.01)

(52) U.S. Cl. .................... 429/97; 429/96; 429/100; 429/175

(58) Field of Classification Search ........... 429/96, 429/97, 100, 175
See application file for complete search history.

(56) References Cited

U.S. PATENT DOCUMENTS 5,203,022 A * 4/1993 Finch et al. ............... 455/127.1
5,689,824 A * 11/1997 Nagai ..................... 455/575.3

* cited by examiner

*Primary Examiner*—Patrick Ryan
*Assistant Examiner*—Julian Mercado
(74) *Attorney, Agent, or Firm*—Jeffrey T. Knapp

(57) ABSTRACT

A latching mechanism of a battery cover assembly (100) is provided. The battery cover assembly includes a battery cover (20) and a housing (10). The latching mechanism includes a limiting mechanism, a hinged mechanism, at least one latching portion (133), and at least one latching arm (28). The limiting mechanism is configured to prevent the battery cover from accidentally detaching from the housing. The hinged mechanism is configured to facilitate both rotation and sliding of the battery cover relative to the housing. Each latching portion is formed on the housing, and each latching arm is formed on the battery cover. The latching arm elastically engages with a respective latching portion in such manner that the battery cover is latched to the housing.

18 Claims, 4 Drawing Sheets

LATCHING MECHANISM FOR BATTERY COVER ASSEMBLY

BACKGROUND OF THE INVENTION

1. Field of the Invention

The present invention relates to a latching mechanism for a battery cover assembly and, particularly, to battery cover assembly including a latching mechanism facilitating a rotatable engagement of the battery cover with the housing.

2. Description of Related Art

Batteries are widely used in portable electronic devices, such as personal digital assistants (PDAs), mobile phones, and so on. A conventional battery is attachably received in a housing of the electronic device, and a battery cover is designed to connect with the housing so as to enclose, retain, and protect the battery. The battery may need to be removed and/or replaced when, for example, it becomes damaged, exhausted, and/or otherwise in need of recharging or replacement. In order to permit removal of the battery, the battery cover must be designed so as to be releasably attached to the housing.

Typically, the battery cover can be slidably engaged with the housing. More specifically, the battery cover is aligned with the housing and directly pushed or slid toward the housing until the battery cover is secured with the housing. However, in some cases the battery cover needs to be rotatably engaged with the housing. More specifically, the battery cover has one side thereof hinging from/with a corresponding side of the housing. The other opposite side of the battery cover is rotated toward the other opposed side of the housing until the battery cover is secured with the housing. However, when the battery cover is slidably assembled with the housing, a good deal of force usually needs to be exerted on the battery cover for it to be detached. Thus, the battery cover could easily be damaged if excessive force is applied. If the battery cover is rotatably assembled to/with the housing, a need to exert excessive force on the battery cover in disassembly can typically be avoided, and the battery cover will not, accordingly, be damaged by excessive applied force.

However, when the battery cover has been rotatably assembled to the housing, there is usually an uneven gap between the battery cover and the housing. Typically, two claws are respectively added on the two inner sidewalls of the battery cover. Correspondingly, two recessed portions are respectively defined within the two external sidewalls of the housing. The two claws each firmly hook with a respective recessed portion so as to eliminate the gap between the battery cover and the housing. However, it is very difficult to strike a balance between eliminating the gap and maintaining an easy detachment of the battery cover. In other words, if the gap is further decreased, the battery cover then generally needs much more force applied thereto to detach.

Therefore, a heretofore-unaddressed need exists in the art to address the aforementioned deficiencies and inadequacies.

SUMMARY

In one aspect, a latching mechanism of a battery cover assembly is provided. The battery cover assembly includes a battery cover and a housing. The latching mechanism includes a limiting/catch mechanism, a hinged mechanism, at least one latching portion, and at least one latching arm. The limiting mechanism is configured to prevent the battery cover from accidentally detaching from the housing. The hinged mechanism is configured to facilitate rotation of the battery cover relative to the housing. Each latching portion is formed on the housing and each latching arm is formed on the battery cover. The latching arm elastically engages with a respective latching portion in such manner that the battery cover is latched to the housing.

In another aspect, another battery cover assembly is provided. The battery cover assembly includes a battery cover, a housing, a limiting mechanism, a hinged mechanism, at least one latching portion, and at least one latching arm. The limiting mechanism is configured to prevent the battery cover from accidentally detaching from the housing. The hinged mechanism is configured to facilitate rotation of the battery cover relative to the housing. Each latching portion is formed on the housing, and each latching arm is formed on the battery cover. The latching arm is elastically deformed by means of engaging with a latching portion, which allows the battery cover to be latched to the housing.

These and other aspects of the present invention will become more apparent from the following detailed description of the preferred embodiments taken in conjunction with the accompanying drawings, although variations and modifications therein may be affected without departing from the spirit and scope of the novel concepts of the disclosure.

BRIEF DESCRIPTION OF THE DRAWINGS

Many aspects of a latching mechanism for a battery cover assembly can be better understood with reference to the following drawings. These drawings are not necessarily drawn to scale, the emphasis instead being placed upon clearly illustrating the principles of the present latching mechanism for the battery cover assembly. Moreover, in the drawings like reference numerals designate corresponding parts throughout the several views. Wherever possible, the same reference numbers are used throughout the drawings to refer to the same or like elements of an embodiment.

DETAILED DESCRIPTION OF PREFERRED EMBODIMENTS

The present latching mechanism for a battery cover assembly is described here in conjunction with the accompanying drawings in FIGS. 1-4. The battery cover assembly is suitable in a portable electronic device, such as a mobile phone, a digital camera, or the like. The mobile phone is taken here as an exemplary application, for the purposes of describing details of the battery cover assembly and the latching mechanism of a present embodiment.

Figure 1:
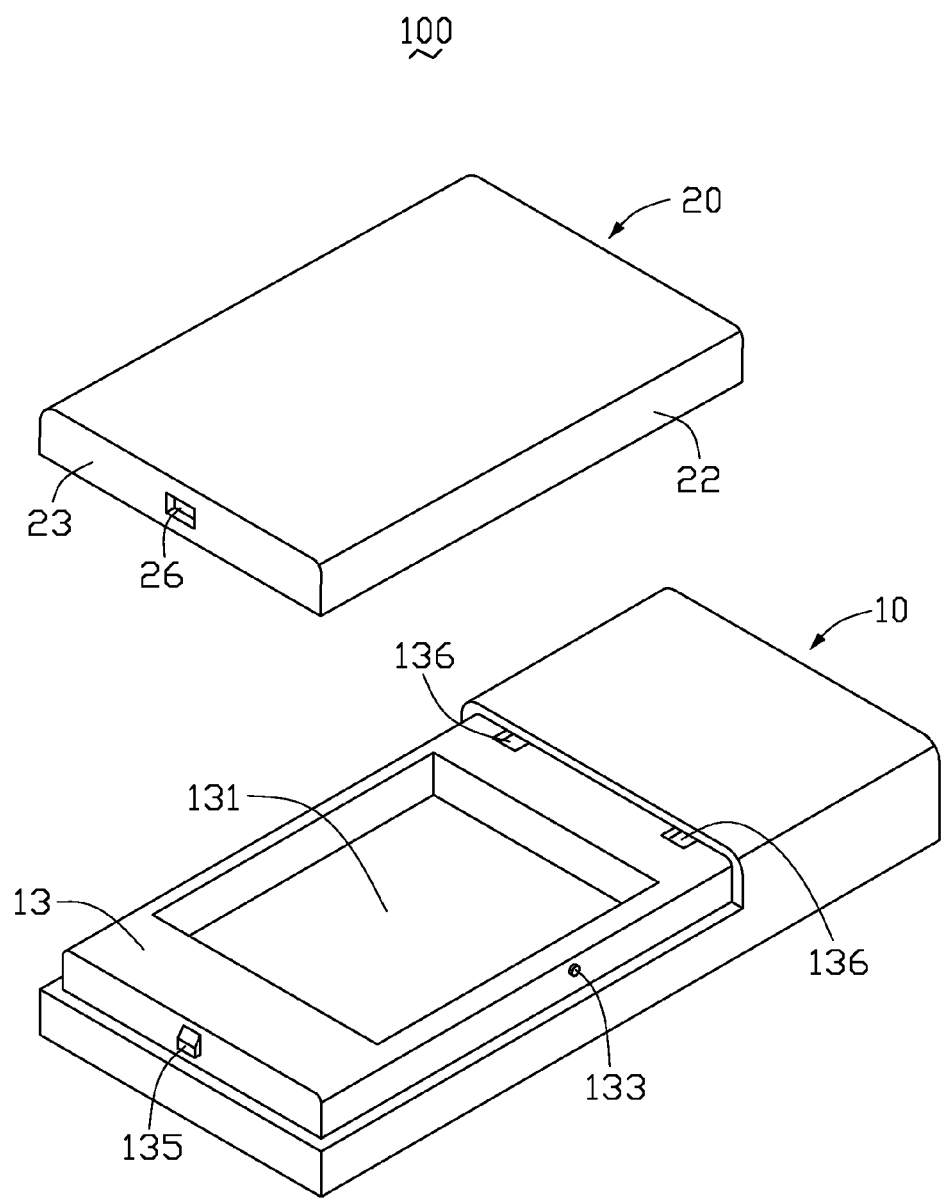
FIG. 1 is an exploded, isometric view of a latching mechanism for a battery cover assembly, in accordance with a present embodiment.

Referring now to FIG. 1, the battery cover assembly 100 includes a housing 10 and a battery cover 20, connected together via the latching mechanism (shown and described in relation to FIGS. 2 and 3, at a later point. The battery cover 20 and the housing 10 are so configured (e.g., structured/arranged) that the battery cover 20 can be rotatably assembled with the housing 10 via the latching mechanism.

The housing 10 is a back portion of the mobile phone, which has a stepped portion 13 formed thereon and extending directly therefrom (e.g., via co-molding). The stepped portion 13 defines a battery compartment 131 therein. The battery compartment 131 is defined accessible to the outside, when not covered, for easy replacement/removal of a battery (not shown). The stepped portion 13 is roughly rectangular and includes two latching portions 133, a latching protrusion 135, and two latching grooves 136. The latching grooves 136, the latching portions 133, and the latching protrusion 135 are located at particular locations surrounding the battery compartment 131.

Two cylindrically-shaped (i.e., columnar) latching portions 133 are arranged on two opposite sidewalls of the stepped portion 13, each latching portion 133 directly extending (e.g., via co-molding) from a respective sidewall. The two latching portions 133 are further arranged in a particular line with each other and perpendicular to the sidewalls of the stepped portion 13. The latching protrusion 135 is generally ledge-shaped and is formed on a first end wall (i.e., a wall proximate a distal end of the housing 10 and perpendicular to the two sidewalls carrying the latching portions 133) of the stepped portion 13. The latching protrusion 135 is further located at the middle of the first end wall of the stepped portion 13. The two latching grooves 136 are each roughly rectangular and are defined in an upper end wall (i.e., generally parallel to the first end wall and distal thereto) of the stepped portion 13. The two latching grooves 136 are also aligned parallel to each other.

Figure 2:
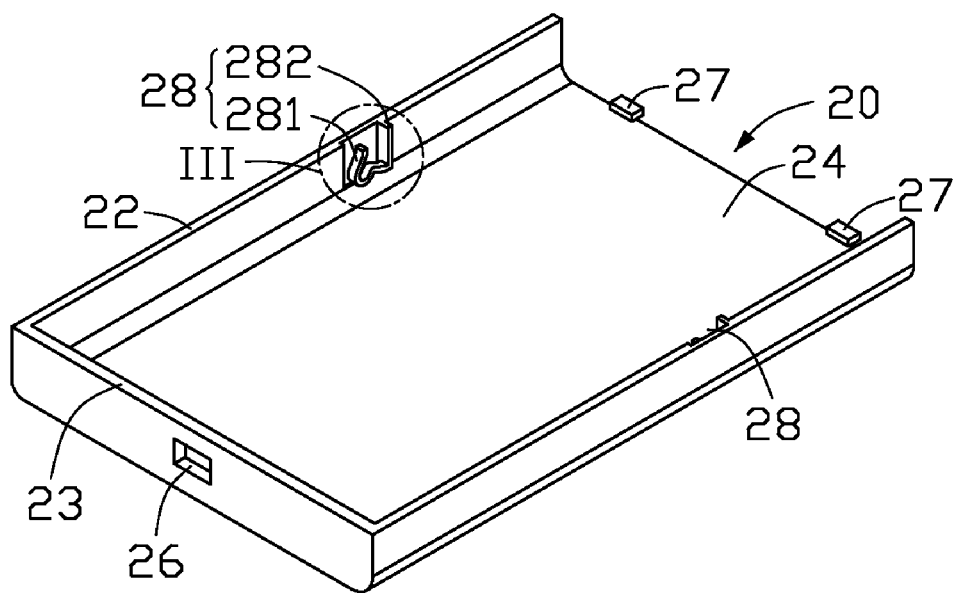
FIG. 2 is an isometric view of a battery cover of the battery cover assembly shown in FIG. 1, illustrating another aspect of the battery cover.

Referring also to FIG. 2, the battery cover 20 is a roughly rectangular shell with two cover sidewalls 22, a cover end wall 23, and a top cover face 24. The cover end wall 23 has a latching aperture 26 defined therethrough. The latching aperture 26 is dimensioned and arranged to mate with the latching protrusion 135 of the housing 10 so that the latching protrusion 135 can be releasably latched in the latching aperture 26. The top cover face 24, the cover end wall 23, and the two cover sidewalls 22 cooperatively define a cover opening therein. The top cover face 24 has two latching blocks 27 setting thereon and extending directly (e.g., co-molded) outwardly/away therefrom and away from the opening of the battery cover 20. The two latching blocks 27 are further arranged parallel with each other and each is dimensioned and arranged to mate in the respective latching groove 136 of the housing 10. Thus, the latching blocks 27 can each be latched in their respective latching grooves 136.

Figure 3:
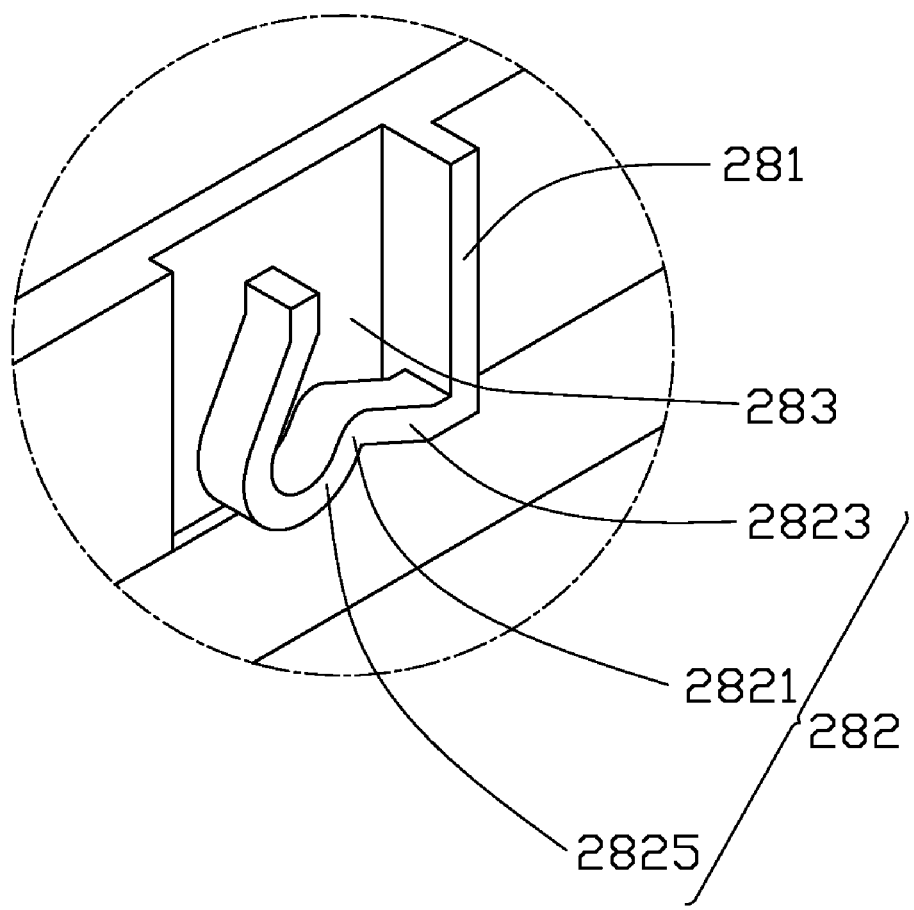
FIG. 3 is an enlarged, partial view of a latching arm of the battery cover assembly of area III shown in FIG. 2.

Referring further to FIG. 3, the two sidewalls 22 each have a latching arm 28 formed thereon. The two latching arms 28 are each formed on an interior surface of their respective sidewall 22. The two latching arms 28 are further located in a particular line with each other and extend essentially perpendicular to the interior surface of the respective adjacent sidewall 22. The latching arm 28 has an approximate W-shape and includes a base portion 281 and an arm portion 282. The base portion 281 and the arm portion 282 cooperatively define an accommodating space 283 configured for accommodating a respective latching portion 133 of the housing 10 in assembly/disassembly of the battery cover assembly 100.

The base portion 281 of a given latching arm 28 is roughly rectangular and protrudes directly (e.g., via co-molding) from the interior surface of the corresponding cover sidewall 22. The base portion 281 acts as a first upward leg of the W-shape. The arm portion 282 is elastic and extends directly (e.g., co-molded) from the base portion 281, along the corresponding cover sidewall 22, initially in the general direction of the cover end wall 23. The arm portion 282 is bent and thus forms a peak wall 2821, a first inclined wall 2823 and a second inclined wall 2825 (i.e., together providing the central portion and the second upward leg of the W-shape). The first and second inclined walls 2823 and 2825 connect two sides of the peak wall 2821, respectively. The first inclined wall 2823 connects to the base portion 281 and the second inclined wall 2825 is positioned apart from the base portion 281. The second inclined wall 2825 has, approximately, a backward J-shape, thus providing the second upward leg of the W-shape, as well as adjoining the peak wall 2821. Each upwardly pointing leg of the W-shape extends away from the top cover face 24.

Figure 4:
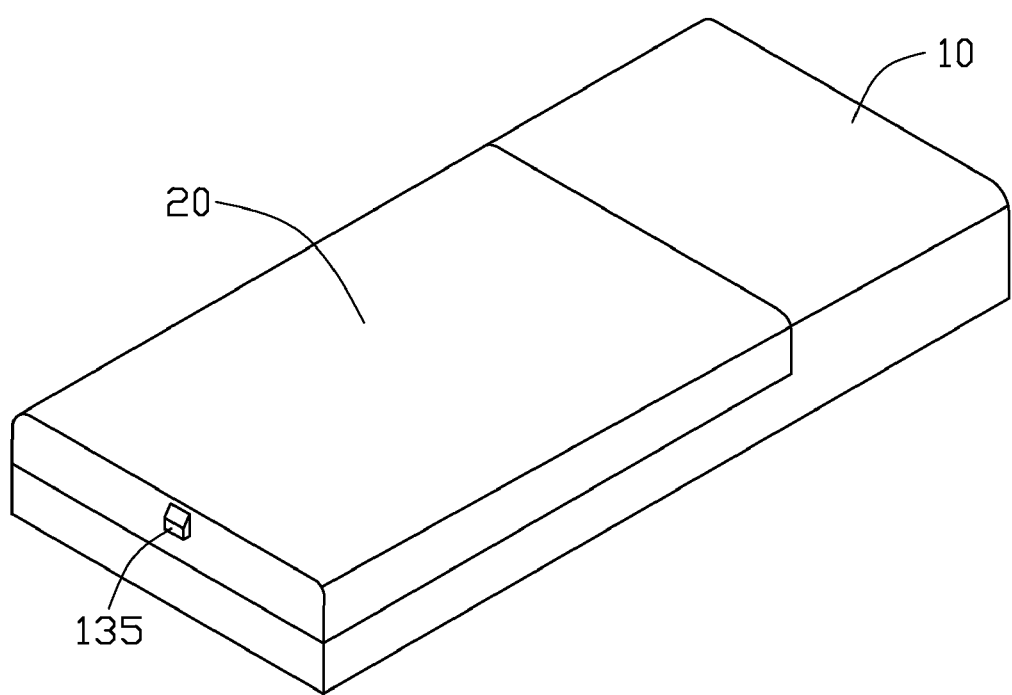
FIG. 4 is an assembled view of the battery cover assembly shown in FIG. 1.

In assembly, referring further to FIG. 4, the battery cover 20 is rotatably attached to the housing 10. The two latching blocks 27 of the battery cover 20 are respectively inserted into the two latching grooves 136 of the housing 10. The battery cover 20 is rotated toward the housing 10. During this stage, each latching portion 133 of the housing 10 is firstly received in the accommodating space 283 of a respective latching arm 28 and contacts with the first inclined wall 2823 of the arm portion 282 of the latching arm 28. Secondly, the latching portion 133 slides along the first inclined wall 2823 toward the peak wall 2821 of the arm portion 282. As such, the latching portion 133 resists/biases the first inclined wall 2823, and the resisting force of the latching portion 133 elastically deforms the first inclined wall 2823 together with the total arm portion 282.

When the latching portion 133 reaches the peak point of the peak wall 2821, the arm portion 282 is deformed/bent to a maximum extent (i.e., the greater the relative peak height of a given latching arm 28, the larger the maximum retention force possibly achieved). After that, the latching portion 133 passes over the peak wall 2821 and resists the second inclined wall 2825 of the arm portion 282. At this time, the latching protrusion 135 of the housing 10 engages into the latching aperture 26 of the battery cover 20. A resisting/spring force, provided by the latching portion 133 resisting the second inclined wall 2825, enables the battery cover 20 to slide toward the stepped portion 13 of the housing 10, effectively helping to snap the battery cover 20 into place relative to the housing 10. Thus, the latching protrusion 135 is held in the latching aperture 26. The latching blocks 27 are secured in the latching grooves 136. The battery cover 20 is firmly attached to the housing 10 and shields the stepped portion 13 and any battery held therein.

When detaching the battery cover 20 from the housing 10, the battery cover 20 is pushed outwardly and the battery cover 20 slides away from the housing 10. In this stage, the latching portion 133 of the housing 10 slides, along the second inclined wall 2825 of the latching arm 28 of the battery cover 20, toward the peak wall 2821 of the latching arm 28 of the battery cover 20. In this sliding stage, the battery cover 20 must be pushed with enough force to overcome the biasing force associated the latching portion 133 (i.e., the deformation force needed to clear the peak wall 2821 of the arm portion 282). After the latching protrusion 135 of the housing 10 disengages from the latching aperture 26 of the battery cover 20, the battery cover 20 is then rotated apart from the housing 10 with the latching blocks 27 thereof engaging into the latching grooves 136. After the latching portion 133 is located outside of the accommodating space 283 of the latching arm 28, the latching blocks 27 are pulled out from the latching grooves 136. Thus, the battery cover 20 is completely detached from the housing 10.

It is to be understood that the latching mechanism, as a whole, includes the latching arms 28 of the battery cover 20 combined with the latching portions 133 of the housing 10, the latching aperture 26 of the battery cover 20 combined with the latching protrusion 135 of the housing 10, and the latching blocks 27 of the battery cover 20 combined with the latching grooves 136 of the housing 10. The latching aperture 26 combined with the latching protrusion 135 can instead be any kind of limiting, holding, or catch mechanism that helps prevent accidental detachment. The limiting/catch mechanism is configured to further limit the ability of the battery cover 20 to pop out/off from the housing 10, when a force (e.g., due to drop or other direct impact), along a direction roughly perpendicular to an upper surface of the housing 10, is applied to the battery cover 20. The latching blocks 27 combined with the latching grooves 136 can instead be any kind of hinged mechanism. The hinged mechanism is configured to facilitate the rotation of the battery cover 20 relative to the housing 10. The hinged mechanism could form a permanent hinge connection between the housing 10 and the battery cover 20, instead of a temporary one as illustrated, so long as the battery cover 20 could both slide and hinge relative to the housing 10, as required by the present latching mechanism.

The latching mechanism firmly attaches the battery cover 20 to the housing 10. The hinged mechanism enables the battery cover 20 to rotatably and slidably engage with the housing 10. The latching arms 28 engaged with the latching portions firmly hold the battery cover 20 and the housing 10 together. Therefore, there is no gap existing between the battery cover 20 and the housing 10. The present configuration of the latching mechanism is easy and simple to use with the battery cover assembly 100. Thus, the battery cover assembly 100 including the latching mechanism is cheap and easy to operate.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A latching mechanism of a battery cover assembly, the battery cover assembly including a battery cover and a housing, the latching mechanism comprising:
    a limiting mechanism configured for preventing the battery cover from accidentally detaching from the housing;
    a hinged mechanism configured to enable the battery cover to both slide and rotate relative to the housing;
    at least one latching portion formed on the housing; and
    at least one latching arm formed on the battery cover, each latching arm elastically resisted against and bent by a respective latching portion from a natural state to a bent state, directly creating an elastic force against the latching portions, the latching arms returning from the bent state to the natural state so that the elastic force decreases and enables the battery cover to be latched to the housing.

2. The latching mechanism of the battery cover assembly as claimed in claim 1, wherein each latching portion is a column, each latching arm comprises an arm portion, the arm portion includes a peak wall and an inclined wall connecting the peak wall, and the latching portion is configured for resisting against and deforming the inclined wall.

3. The latching mechanism of the battery cover assembly as claimed in claim 2, wherein battery cover comprises two cover sidewalls and a cover end wall, the latching arms being respectively formed on the two cover sidewalls.

4. The latching mechanism of the battery cover assembly as claimed in claim 3, wherein the arm portion further comprises a base portion and another inclined wall, the base portion is formed on the sidewall, and the arm portion initially extends generally toward the cover end wall from the base portion.

5. The latching mechanism of the battery cover assembly as claimed in claim 4, wherein the latching arm is approximately W-shaped and the arm portion and the base portion cooperatively define an accommodating space configured for accommodating a respective latching portion of the housing.

6. The latching mechanism of the battery cover assembly as claimed in claim 2, wherein the housing includes a stepped portion, and the latching portions are respectively formed on two sidewalls of the stepped portion.

7. The latching mechanism of the battery cover assembly as claimed in claim 1, wherein the limiting mechanism comprises a latching aperture defined through a sidewall of the battery cover and a corresponding latching protrusion formed on the housing, the latching protrusion being configured to releasably engage with the latching aperture.

8. The latching mechanism of the battery cover assembly as claimed in claim 7, wherein the battery cover comprises a cover end wall, the latching aperture is defined through the cover end wall, the housing includes a stepped portion, and the latching protrusion is formed on an end wall of the stepped portion.

9. The latching mechanism of the battery cover assembly as claimed in claim 1, wherein the hinged mechanism comprises a latching block formed on the battery cover and a latching groove defined in the housing, the latching block being configured to engage in the latching groove.

10. The latching mechanism of the battery cover assembly as claimed in claim 9, wherein the battery cover defines an opening, the latching block extends from an interior surface of the battery cover and extends away from the opening, the housing comprises a stepped portion, and the latching groove is defined in an upper surface of the stepped portion.

11. A battery cover assembly, comprising:
    a battery cover;
    a housing;
    a limiting mechanism configured for preventing the battery cover from accidentally detaching from the housing;
    a hinged mechanism configured to enable the battery cover to both slide and rotate relative to the housing;
    at least one latching portion formed on the housing; and
    at least one elastic latching arm formed on the battery cover, each latching arm elastically resisted against and bent by a respective latching portion from a natural state to a bent state, directly creating an elastic force against the latching portions, the latching arms returning from the bent state to the natural state so that the elastic force decreases, thereby allowing the battery cover to be latched to the housing.

12. The latching mechanism of the battery cover assembly as claimed in claim 11, wherein each latching portion is a column, each latching arm comprises an arm portion, the arm portion includes a peak wall and an inclined wall connecting the peak wall, and the latching portion is configured for resisting against and deforming the inclined wall.

13. The latching mechanism of the battery cover assembly as claimed in claim 12, wherein battery cover comprises two cover sidewalls and a cover end wall, the latching arms being respectively formed on the two cover sidewalls.

14. The latching mechanism of the battery cover assembly as claimed in claim 13, wherein the arm portion further comprises a base portion and another inclined wall, the base portion is formed on the sidewall, and the arm portion initially extends generally toward the cover end wall from the base portion.

15. The latching mechanism of the battery cover assembly as claimed in claim 14, wherein the latching arm is approximately W-shaped and the arm portion and the base portion cooperatively define an accommodating space configured for accommodating a respective latching portion of the housing.

16. The latching mechanism of the battery cover assembly as claimed in claim 12, wherein the housing includes a stepped portion, and the latching portions are respectively formed on two sidewalls of the stepped portion.

17. The latching mechanism of the battery cover assembly as claimed in claim 11, wherein the limiting mechanism comprises a latching aperture defined through a sidewall of the battery cover and a corresponding latching protrusion formed on the housing, the latching protrusion being configured to releasably engage with the latching aperture.

18. The latching mechanism of the battery cover assembly as claimed in claim 11, wherein the battery cover comprises a cover end wall, the latching aperture is defined through the cover end wall, the housing includes a stepped portion, and the latching protrusion is formed on an end wall of the stepped portion.

* * * * *